US011669692B2

(12) United States Patent
Kalia et al.

(10) Patent No.: US 11,669,692 B2
(45) Date of Patent: Jun. 6, 2023

(54) EXTRACTION OF NAMED ENTITIES FROM DOCUMENT DATA TO SUPPORT AUTOMATION APPLICATIONS

(71) Applicant: International Business Machines Corporation, Armonk, NY (US)

(72) Inventors: Anup Kalia, Elmsford, NY (US); Tarek Sakakini, Urbana, IL (US); Yu Deng, Yorktown Heights, NY (US); Jin Xiao, White Plains, NY (US); Maja Vukovic, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 813 days.

(21) Appl. No.: 16/510,657

(22) Filed: Jul. 12, 2019

(65) Prior Publication Data

US 2021/0012179 A1    Jan. 14, 2021

(51) Int. Cl.
*G06F 40/295* (2020.01)
*G06F 40/40* (2020.01)
*G06F 40/30* (2020.01)

(52) U.S. Cl.
CPC .............. *G06F 40/40* (2020.01); *G06F 40/30* (2020.01)

(58) Field of Classification Search
CPC .................................................. G06F 40/295
See application file for complete search history.

(56) References Cited

U.S. PATENT DOCUMENTS

| 8,655,646 | B2 | 2/2014 | Lee et al. |
| 8,738,359 | B2 | 5/2014 | Gupta et al. |
| 8,838,439 | B2 | 9/2014 | Butters et al. |
| 9,697,475 | B1 * | 7/2017 | Subramanya .......... G06N 20/00 |
| 9,721,002 | B2 | 8/2017 | Pfeifer et al. |
| 2011/0035210 | A1 | 2/2011 | Rosenfeld et al. |

(Continued)

OTHER PUBLICATIONS

Chiu, Jason PC, and Eric Nichols. "Named entity recognition with bidirectional LSTM-CNNs." Transactions of the association for computational linguistics 4 (2016): 357-370. (Year: 2016).*

(Continued)

*Primary Examiner* — Jialong He
(74) *Attorney, Agent, or Firm* — Amin, Turocy & Watson, LLP

(57) ABSTRACT

Systems, computer-implemented methods, and computer program products that can facilitate extraction of named entities from document data to support automation applications are provided. According to an embodiment, a system can comprise a memory that stores computer executable components and a processor that executes the computer executable components stored in the memory. The computer executable components can comprise an entity extraction component that extracts, using a first machine learning process, a first data entity and a second data entity from document data indicative of a textual information. The computer executable components can further comprise a relation extraction component that determines, using a second machine learning process, a relation between the first data entity and the second data entity to generate a knowledge data graph used to execute an application associated with natural language processing for the document data.

12 Claims, 12 Drawing Sheets

(56) References Cited

U.S. PATENT DOCUMENTS

| | | | |
|---|---|---|---|
| 2011/0145251 A1 | 6/2011 | Lee et al. | |
| 2012/0158633 A1* | 6/2012 | Eder | G16H 50/20 |
| | | | 707/E17.014 |
| 2013/0204835 A1 | 8/2013 | Yao et al. | |
| 2014/0277921 A1 | 9/2014 | Gujjar et al. | |
| 2017/0337236 A1* | 11/2017 | Jurowicz | G06F 16/2365 |
| 2018/0089382 A1 | 3/2018 | Allen et al. | |
| 2018/0196881 A1* | 7/2018 | Lundin | G06F 40/205 |

OTHER PUBLICATIONS

Jie, Zhanming, Aldrian Muis, and Wei Lu. "Efficient dependency-guided named entity recognition." Proceedings of the AAAI Conference on Artificial Intelligence. vol. 31. No. 1. 2017. (Year: 2017).*

Panchendrarajan, Rrubaa, and Aravindh Amaresan. "Bidirectional LSTM-CRF for named entity recognition." Proceedings of the 32nd Pacific Asia Conference on Language, Information and Computation. 2018. (Year: 2018).*

Dasgupta, et al., Fine Grained Classification of Personal Data Entities, Nov. 23, 2018, 8 pages.

Ibm.com, IBM Control Desk on Cloud—Overview—United States, https://www.ibm.com/us-en/marketplace/it-service-management. Retrieved: May 8, 2019, 3 pages.

Lample, et al., Neural Architectures for Named Entity Recognition, Proceedings of NAACL-HLT 2016, Jun. 12-17, 2016, pp. 260-270.

Servicenow.com, ServiceNow—Digital Workflows for Enterprise—Make work, work better., https://www.servicenow.com/, Retrieved: May 8, 2019, 4 pages.

Xu, et al., Improved Relation Classification by Deep Recurrent Neural Networks with Data Augmentation, Oct. 13, 2016, 10 pages.

Mel, et al., The NIST Definition of Cloud Computing, National Institute of Standards and Technology Special Publication 800-145, Sep. 2011, 7 Pages.

\* cited by examiner

```
(ROOT
  (S
    (VP (VB Remove)
      (NP (DT the) (NNP Queue) (NNP Billback) (NN database))
      (PP (IN from)
        (NP (NNP quartz) (CD 109))))))
```

EXTRACTION OF NAMED ENTITIES FROM DOCUMENT DATA TO SUPPORT AUTOMATION APPLICATIONS

BACKGROUND

The subject disclosure relates to entity extraction, and more specifically, to extraction of named entities from document data to support automation applications.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that can facilitate extraction of named entities from document data to support automation applications are described.

According to an embodiment, a system can comprise a memory that stores computer executable components and a processor that executes the computer executable components stored in the memory. The computer executable components can comprise an entity extraction component that extracts, using a first machine learning process, a first data entity and a second data entity from document data indicative of a textual information. The computer executable components can further comprise a relation extraction component that determines, using a second machine learning process, a relation between the first data entity and the second data entity to generate a knowledge data graph used to execute an application associated with natural language processing for the document data.

According to another embodiment, a computer-implemented method can comprise extracting, by a system operatively coupled to a processor, using a first machine learning process, a first data entity and a second data entity from document data indicative of a textual information. The computer-implemented method can further comprise determining, by the system, using a second machine learning process, a relation between the first data entity and the second data entity to generate a knowledge data graph used to execute an application associated with natural language processing for the document data.

According to another embodiment, a computer program product facilitating extraction of named entities from document data to support automation applications is provided. The computer program product comprising a computer readable storage medium having program instructions embodied therewith, the program instructions executable by a processor to cause the processor to extract, by the processor, using a first machine learning process, a first data entity and a second data entity from document data indicative of a textual information. The program instructions are further executable by the processor to cause the processor to determine, by the processor, using a second machine learning process, a relation between the first data entity and the second data entity to generate a knowledge data graph used to execute an application associated with natural language processing for the document data.

DESCRIPTION OF THE DRAWINGS

FIG. 3 illustrates a diagram of an example, non-limiting dependency tree that can facilitate extraction of named entities from document data to support automation applications in accordance with one or more embodiments described herein.

DETAILED DESCRIPTION

Figure 1:
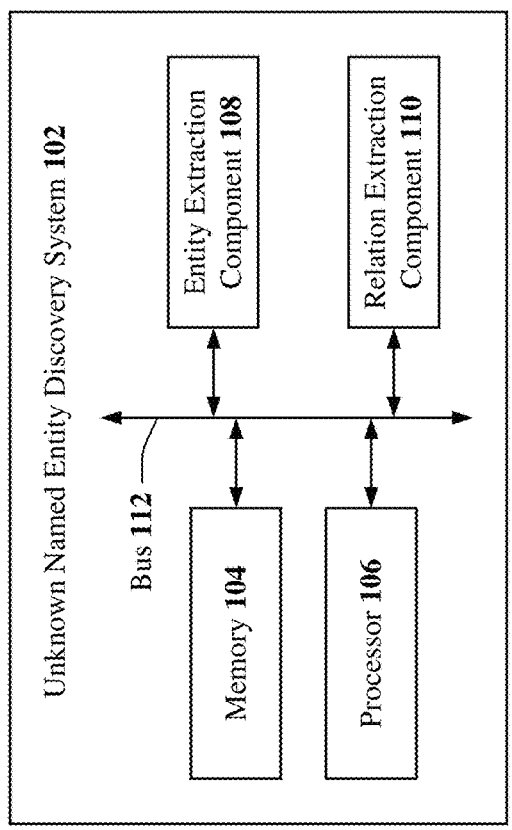
FIG. 1 illustrates a block diagram of an example, non-limiting system that can facilitate extraction of named entities from document data to support automation applications in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Extracting named entities from document data (e.g., information technology (IT) documents, change requests (tickets), service requests (tickets), internet technology documents, etc.) is extremely useful for several purposes. As referenced herein, named entity and/or named entities can describe natural language (e.g., textual information) comprising both concept data (e.g., context data) and instance data. Extracting named entities can be useful to, for example: generate an IT instance level knowledge graph with entities and their relationships; process a change request (ticket) and/or a service request (ticket) having multiple entities of same type of an entity of different lengths ranging from one word to multiple words; and/or another purpose. Such instance level knowledge graph can be used to, for example: a) automate change request for execution by extracting relevant parameters; b) augment additional support for a configuration management database (CMDB) completeness (e.g., by discovering information such as, for example, database names and/or types, server names and/or types, disk drive names and/or types, and/or other information that can be stored in a CMDB); c) build profiles of servers that are not exposed to CMDB discovery process; and/or d) based on instance data, expand the scope of existing knowledge graphs thereby improving a common data model (CDM).

A problem with existing information retrieval (IR) technologies such as, for example, natural language processing technologies, named entity recognition technologies, and/or another IR technology is that they rely on supervised learning techniques (e.g., as opposed to unsupervised learning techniques and/or active learning techniques), which can require manual intervention (e.g., by a human) and/or can limit the scope of named entities such technologies can discover (e.g., context data, instance data, etc.). Another problem with such existing IR technologies is that they do not enable discovery of unknown named entities (e.g., new named entities that such IR technologies have not yet processed and/or learned). For example, such existing IR technologies do not enable discovery of named entities that were not included in training data used to train such IR technologies (e.g., they do not enable discovery of unlabeled named entities, unclassified named entities, etc.). As certain domains (e.g., IT, internet technology, etc.) evolve continuously, so do the named entities used in document data (e.g., change requests, service requests, etc.) associated with such domains. In accordance with one or more embodiments described herein, the subject disclosure enables discovery of such unknown named entities in such document data based on concept data and/or instance data in the document data (e.g., by discovering context in the document data and/or relationship(s) of one or more unknown named entities with such context, as described in detail below).

FIG. 1 illustrates a block diagram of an example, non-limiting system 100 that can facilitate extraction of named entities from document data to support automation applications in accordance with one or more embodiments described herein. In some embodiments, system 100 can comprise an unknown named entity discovery system 102. In some embodiments, unknown named entity discovery system 102 can be associated with a cloud computing environment. For example, unknown named entity discovery system 102 can be associated with cloud computing environment 1150 described below with reference to FIG. 11 and/or one or more functional abstraction layers described below with reference to FIG. 12 (e.g., hardware and software layer 1260, virtualization layer 1270, management layer 1280, and/or workloads layer 1290). In some embodiments, unknown named entity discovery system 102 can comprise a memory 104, a processor 106, an entity extraction component 108, a relation extraction component 110, and/or a bus 112.

It should be appreciated that the embodiments of the subject disclosure depicted in various figures disclosed herein are for illustration only, and as such, the architecture of such embodiments are not limited to the systems, devices, or components depicted therein. For example, in some embodiments, system 100 and/or unknown named entity discovery system 102 can further comprise various computer or computing-based elements described herein with reference to operating environment 1000 and FIG. 10. In several embodiments, such computer or computing-based elements can be used in connection with implementing one or more of the systems, devices, components, or computer-implemented operations shown and described in connection with FIG. 1 or other figures disclosed herein.

According to multiple embodiments, memory 104 can store one or more computer or machine readable, writable, or executable components or instructions that, when executed by processor 106, can facilitate execution of operations defined by the executable component(s) or instruction(s). For example, memory 104 can store computer or machine readable, writable, or executable components or instructions that, when executed by processor 106, can facilitate execution of the various functions described herein relating to unknown named entity discovery system 102, entity extraction component 108, relation extraction component 110, and/or another component associated with unknown named entity discovery system 102, as described herein with or without reference to the various figures of the subject disclosure.

In some embodiments, memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 1016 and FIG. 10. Such examples of memory 104 can be employed to implement any embodiments of the subject disclosure.

According to multiple embodiments, processor 106 can comprise one or more types of processors or electronic circuitry that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, and/or another type of processor. Further examples of processor 106 are described below with reference to processing unit 1014 and FIG. 10. Such examples of processor 106 can be employed to implement any embodiments of the subject disclosure.

In some embodiments, unknown named entity discovery system 102, memory 104, processor 106, entity extraction component 108, relation extraction component 110, and/or another component of unknown named entity discovery system 102 as described herein can be communicatively, electrically, and/or operatively coupled to one another via a bus 112 to perform functions of system 100, unknown named entity discovery system 102, and/or any components coupled therewith. In several embodiments, bus 112 can comprise one or more memory bus, memory controller, peripheral bus, external bus, local bus, and/or another type of bus that can employ various bus architectures. Further examples of bus 112 are described below with reference to system bus 1018 and FIG. 10. Such examples of bus 112 can be employed to implement any embodiments of the subject disclosure.

According to multiple embodiments, unknown named entity discovery system 102 can comprise any type of component, machine, device, facility, apparatus, and/or instrument that comprises a processor and/or can be capable of effective and/or operative communication with a wired and/or wireless network. All such embodiments are envisioned. For example, unknown named entity discovery system 102 can comprise a server device, a computing device, a general-purpose computer, a special-purpose computer, a quantum computing device (e.g., a quantum computer, a quantum processor, etc.), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

In some embodiments, unknown named entity discovery system 102 can be coupled (e.g., communicatively, electrically, operatively, etc.) to one or more external systems, sources, and/or devices (e.g., computing devices, communication devices, etc.) via a data cable (e.g., High-Definition Multimedia Interface (HDMI), recommended standard (RS) 232, Ethernet cable, etc.). In some embodiments, unknown named entity discovery system 102 can be coupled (e.g., communicatively, electrically, operatively, etc.) to one or more external systems, sources, and/or devices (e.g., computing devices, communication devices, etc.) via a network.

According to multiple embodiments, such a network can comprise wired and/or wireless networks, including, but not limited to, a cellular network, a wide area network (WAN) (e.g., the Internet), and/or a local area network (LAN). For example, unknown named entity discovery system 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, unknown named entity discovery system 102 can thus include hardware (e.g., a central processing unit (CPU), a transceiver, a decoder), software (e.g., a set of threads, a set of processes, software in execution) and/or a combination of hardware and software that facilitates communicating information between unknown named entity discovery system 102 and external systems, sources, and/or devices (e.g., computing devices, communication devices, etc.).

In some embodiments, unknown named entity discovery system 102 can comprise one or more computer and/or machine readable, writable, and/or executable components and/or instructions that, when executed by processor 106, can facilitate performance of operations defined by such component(s) and/or instruction(s). Further, in some embodiments, any component associated with unknown named entity discovery system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, entity extraction component 108, relation extraction component 110, and/or any other components associated with unknown named entity discovery system 102 as disclosed herein (e.g., communicatively, electronically, and/or operatively coupled with or employed by unknown named entity discovery system 102), can comprise such computer and/or machine readable, writable, and/or executable component(s) and/or instruction(s). Consequently, in some embodiments, unknown named entity discovery system 102 and/or any components associated therewith as disclosed herein, can employ processor 106 to execute such computer and/or machine readable, writable, and/or executable component(s) and/or instruction(s) to facilitate performance of one or more operations described herein with reference to unknown named entity discovery system 102 and/or any such components associated therewith.

In some embodiments, unknown named entity discovery system 102 can facilitate performance of operations executed by and/or associated with entity extraction component 108, relation extraction component 110, and/or another component associated with unknown named entity discovery system 102 as disclosed herein. For example, as described in detail below, unknown named entity discovery system 102 can facilitate (e.g., via processor 106): extracting, using a first machine learning process, a first data entity and a second data entity from document data indicative of a textual information; and/or determining, using a second machine learning process, a relation between the first data entity and the second data entity to generate a knowledge data graph used to execute an application associated with natural language processing for the document data. In some embodiments, as described in detail below, unknown named entity discovery system 102 can further facilitate (e.g., via processor 106): processing second document data to generate training data for the first machine learning process and the second machine learning process, where the document data is first document data; generating a common data model associated with the natural language processing for the document data; generating a server profile based on the knowledge data graph; performing an automation process associated with second document data based on the knowledge data graph, where the document data is first document data; and/or augmenting a configuration management database based on the knowledge data graph.

According to multiple embodiments, entity extraction component 108 can extract, using a machine learning process, one or more data entities from document data. For example, entity extraction component 108 can extract, using a machine learning process, one or more data entities from document data including, but not limited to, an information technology (IT) document, an internet technology document, and/or another document comprising natural language (e.g., textual information). For instance, entity extraction component 108 can extract, using a machine learning process, one or more data entities from such document data defined above where such one or more data entities can comprise one or more unknown named entities (e.g., one or more unlabeled named entities, one or more unclassified named entities, etc.).

In some embodiments, entity extraction component 108 can extract such one or more data entities from such document data using a machine learning process comprising a machine learning model that has been trained to extract one or more unknown named entities (e.g., one or more unlabeled named entities, one or more unclassified named entities, etc.) from such document data. For example, entity extraction component 108 can employ a neural network such as, for instance, a bidirectional long short-term memory conditional random fields (BiLSTM-CRF) neural network that has been trained (e.g., via an unsupervised learning technique(s), a supervised learning technique(s), an active learning technique(s), etc.) to extract one or more unknown named entities from such document data defined above.

In some embodiments, entity extraction component 108 can extract (e.g., via a BiLSTM-CRF neural network) one or more unknown named entities from such document data defined above, where such one or more unknown named entities can include, but are not limited to: annotations (e.g., column name (COLN), database instance name (DIN), database object name (DJOBN), database name (DN), field name (FIELDN), table name (TBLN), service instance (SI), etc.); single word entities (e.g., DIN: db2qae, SI: g0379acwxwas, COLN: pentres.tb_cppar, etc.); multi word entities (e.g., DN: queue billback, TBLN: Legacy chubb rcc emergency, SI: quartz 109, DN: georgia intranet application production, etc.); multiple entities (e.g., multiple instances such as, for instance, SI: topwdengp009, topwdengp0010, topwdengp011; TBLN: erdeptidpf, erssca2rpf, ersscrccpf; etc.), a combination (mixture) thereof (e.g., multi word entities mixed with multiple instances such as, for instance, DN: global treaties apollo mixed with SI: us01wrs6001, uk01wrs6003; etc.), and/or another unknown named entity.

In some embodiments, such one or more unknown named entities can be discovered manually by, for instance, a human extracting them from IT documents, where such manually discovered one or more unknown named entities can be used to train (e.g., via supervised learning, unsupervised learning, active learning, etc.) a neural network model (e.g., a neural network model that can be employed by entity extraction component 108) to automatically (e.g., without assistance from a human) discover and/or extract such one or more unknown named entities (e.g., as described below). In some embodiments, entity extraction component 108 can employ a neural network model (e.g., a BiLSTM-CRF neural network) that can be trained to discover (e.g., via supervised learning) and/or extract such one or more unknown named entities (e.g., as described below). For example, entity extraction component 108 can employ a neural network model (e.g., a BiLSTM-CRF neural network) that can be trained to discover and/or extract such one or more unknown named entities using training data comprising labeled known named entities (e.g., labeled via a human) present in a document (e.g., an IT change request, an IT service request, etc.). In this example, such labeled known named entities can be labeled based on one or more rule based approaches (e.g., via rule based approach to discover actions using a typed dependency tree generated from an IT document as described below). In some embodiments, entity extraction component 108 can employ a neural network model (e.g., a BiLSTM-CRF neural network) that can learn to discover (e.g., via unsupervised learning and/or active learning) and/or extract such one or more unknown named entities (e.g., as described below).

In some embodiments, entity extraction component 108 can extract, using a first machine learning process, a first data entity and/or a second data entity from document data indicative of a textual information for an internet technology application (e.g., an information technology (IT) application). For example, as described below, entity extraction component 108 can employ a machine learning process comprising a neural network model (e.g., a BiLSTM-CRF neural network) to extract from an IT document (e.g., an IT change request, an IT service request, etc.) a first data entity comprising a context and/or a second data entity comprising a word entity that can be associated with such context (e.g., as determined by relation extraction component 110 as described below).

Active Learning (Context Extraction)

In some embodiments, entity extraction component 108 can employ a neural network model (e.g., a BiLSTM-CRF neural network) that can be trained to extract and/or can actively learn to extract one or more unknown named entities by extracting context from IT documents. For example, such a model can be trained and/or actively learn to extract one or more unknown named entities by employing a parser (e.g., a standard parser, standard parser generator, etc.) to generate a typed dependency tree from a given IT document (e.g., via inputting such IT document into a standard parser, standard parser generator, etc.). In some embodiments, such a parser (e.g., a standard parser, standard parser generator, etc.) can enable extraction (e.g., via entity extraction component 108) of the context based on one or more rules. For example, based on a rule to generate an action pattern, such a parser can generate (e.g., extract and/or enable extraction of) a verb and a corresponding noun. For instance, as illustrated in FIG. 2, such a parser can enable extraction (e.g., via entity extraction component 108) of the verb "Remove" from dependency tree 200 based on its verb postag (denoted as VB in FIG. 2) and the noun "database" (denoted as NN in FIG. 2) based on a relationship rule (e.g., the relationship rule <VB>dobj<NN>), where the noun "database" in the action can constitute a context.

Figure 2:
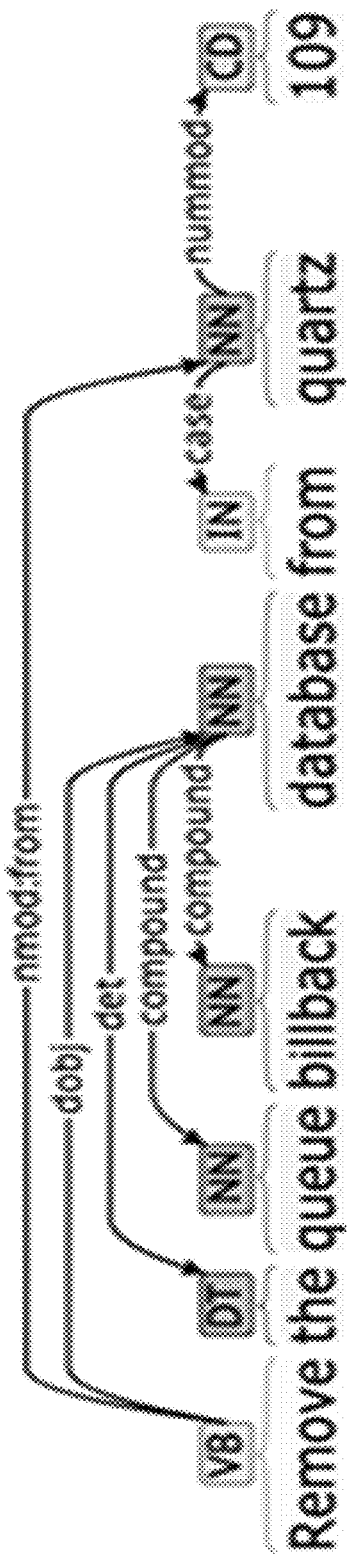
FIG. 2 illustrates a diagram of an example, non-limiting dependency tree that can facilitate extraction of named entities from document data to support automation applications in accordance with one or more embodiments described herein.

FIG. 2 illustrates a diagram of an example, non-limiting dependency tree 200 that can facilitate extraction of named entities from document data to support automation applications in accordance with one or more embodiments described herein. Repetitive description of like elements and/or processes employed in respective embodiments is omitted for sake of brevity.

According to multiple embodiments, dependency tree 200 can comprise a typed dependency tree. In some embodiments, dependency tree 200 can comprise an example sentence "Remove the queue billback database from quartz 109," which can be extracted (e.g., via read and/or write instructions executed by processor 106, via entity extraction component 108, etc.) from an IT document (e.g., an IT change request, an IT service request, etc.). In some embodiments, entity extraction component 108 can employ a parser (e.g., a standard parser, standard parser generator, etc.) to generate dependency tree 200 based on the example sentence "Remove the queue billback database from quartz 109." In some embodiments, entity extraction component 108 can employ such a parser (e.g., a standard parser, standard parser generator, etc.) to generate dependency tree 200 to enable identification of and/or extraction of a verb and a corresponding noun in the example sentence "Remove the queue billback database from quartz 109," where such a noun can constitute a context. For example, as described above, based on a rule to generate an action pattern, such a parser can generate dependency tree 200 to enable extraction (e.g., via entity extraction component 108) of such a verb and a corresponding noun that can constitute a context, where such extraction can be expressed as: [action: <verb: remove, noun: database>, context: database].

Active Learning (Entity Extraction)

In some embodiments, entity extraction component 108 can employ a neural network model (e.g., a BiLSTM-CRF neural network) that can be trained to extract and/or can actively learn to extract one or more unknown named entities by extracting context as described above, as well as one or more entities associated with the context from IT documents (e.g., such entities associated with the context can comprise one or more word entities related to the context, surrounding the context, significant to the context, etc.). For example, such a model can be trained and/or actively learn to extract one or more unknown named entities by employing a parser (e.g., a standard parser, standard parser generator, etc.) to generate a parse dependency tree from a given IT document (e.g., via inputting such IT document into a standard parser, standard parser generator, etc.). In some embodiments, such a parser (e.g., a standard parser, standard parser generator, etc.) can enable extraction (e.g., via entity extraction component 108) of the context and/or such one or more entities defined above that can be associated with the context based on an inference of such an association. For example, such a parser can enable extraction of one or more words having postags under the noun phrases (denoted as NP in FIG. 3), where such one or more words can be inferred to be associated with the context. For instance, as illustrated in FIG. 3, such a parser can enable extraction (e.g., via entity extraction component 108) of all nouns in the noun phrases "The Queue Billback database" and/or "Quartz 109" from dependency tree 300 based on their noun phrases postags (denoted as NP in FIG. 3).

FIG. 3 illustrates a diagram of an example, non-limiting dependency tree 300 that can facilitate extraction of named entities from document data to support automation applications in accordance with one or more embodiments described herein. Repetitive description of like elements and/or processes employed in respective embodiments is omitted for sake of brevity.

According to multiple embodiments, dependency tree 300 can comprise a parse dependency tree. In some embodiments, entity extraction component 108 can employ a parser (e.g., a standard parser, standard parser generator, etc.) to generate dependency tree 300 based on the example sentence "Remove the queue billback database from quartz 109." In some embodiments, entity extraction component 108 can employ such a parser (e.g., a standard parser, standard parser generator, etc.) to generate dependency tree 300 to examine each of the example noun phrases (NP) "The Queue Billback database" and/or "Quartz 109" as illustrated in FIG. 3. In some embodiments, each of such noun phrases can be examined (e.g., via entity extraction component 108) under the light of the context "database" (e.g., by taking into account the position within the entire noun phrase of each noun with respect to the context). In some embodiments, annotators possible nouns associated with the context can be suggested (e.g., inferred) by, for instance, entity extraction component 108. For example, the word "Queue" and the word "Billback" can be proper nouns (denoted as NNP in FIG. 3) that can be determined (e.g., inferred) to be associated with the context "database" (e.g., via inference based on the position of such words in the noun phrase with respect to the context "database"). In some embodiments, entity extraction component 108 can employ a parser (e.g., a standard parser, standard parser generator, etc.) to generate dependency tree 300 to enable extraction (e.g., via entity extraction component 108) of such proper nouns "Queue" and/or "Billback" and such context "database," where such extraction can be expressed as: [action: <verb: remove, noun: database>, context: database].

In some embodiments, a context can be ordered differently around the nouns. For example, with reference to the example sentence described above from an IT document stating "Remove the queue billback database from quartz 109," such a sentence can be phrased as "Remove the database queue billback from quartz 109." In some embodiments, entity extraction component 108 can employ a supervised classification approach to predict one or more unknown named entities. For example, entity extraction component 108 can employ a supervised classification approach such as, for instance, a long short-term memory conditional random field (LSTM-CRF) neural network to predict one or more unknown named entities. For instance, entity extraction component 108 can employ a supervised classification approach such as, for instance, model 400 illustrated in FIG. 4 to predict one or more unknown named entities as described below.

Figure 4:
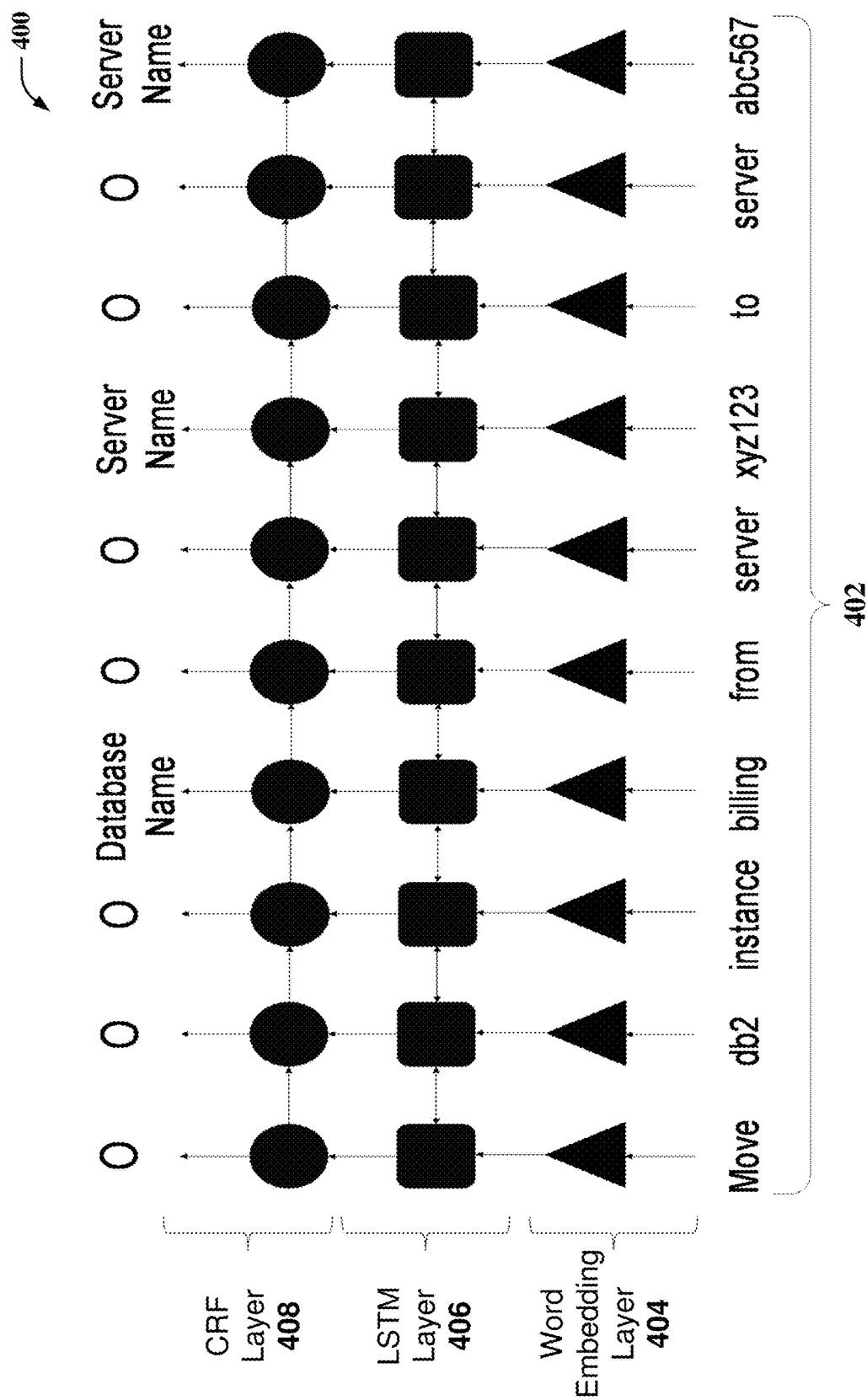
FIG. 4 illustrates a diagram of an example, non-limiting model that can facilitate extraction of named entities from document data to support automation applications in accordance with one or more embodiments described herein.

FIG. 4 illustrates a diagram of an example, non-limiting model 400 that can facilitate extraction of named entities from document data to support automation applications in accordance with one or more embodiments described herein. Repetitive description of like elements and/or processes employed in respective embodiments is omitted for sake of brevity.

According to multiple embodiments, model 400 can comprise a supervised classification model. For example, model 400 can comprise a long short-term memory conditional random field (LSTM-CRF) neural network. In some embodiments, model 400 can receive as input an example sentence 402 that can be extracted (e.g., via read and/or write instructions executed by processor 106, via entity extraction component 108, etc.) from an IT document (e.g., an IT change request, an IT service request, etc.). For example, model 400 can receive as input example sentence 402 comprising "Move db2 instance billing from server xyz123 to server abc567," as illustrated in FIG. 4.

In some embodiments, model 400 can comprise a word embedding layer 404, a long short-term memory (LSTM) layer 406, and/or a conditional random field (CRF) layer 408 as illustrated in FIG. 4. In some embodiments, word embedding layer 404 can map each word of the input example sentence to a distributed representation representing the semantics of a word and its character structure (e.g., via mapping each word to a fixed-length vector), which can be processed by model 400. In some embodiments, at each word in the input example sentence, LSTM layer 406 can generate a distributed representation which can encode (e.g., via mapping each word to a fixed-length vector) the semantics of the word along with its context. For example, the fact that "xyz123" is positioned within example sentence 402 after the word "server" can be encoded by LSTM layer 406.

In some embodiments, CRF Layer 408 can receive as input the distributed representation of LSTM layer 406 and can further generate a label for each word to extract the entities.

In some embodiments, model 400 can receive as input training data and/or one or more labels that can be learned by entity extraction component 108 via active learning as described above. In some embodiments, based on receiving such input training data and/or one or more labels, model 400 can be employed (e.g., by unknown named entity discovery system 102) to build a training model that can be used to extract unknown named entities from document data (e.g., IT change requests, IT service requests, etc.).

Returning to FIG. 1, according to multiple embodiments, relation extraction component 110 can determine, using a second machine learning process, a relation between a first data entity and a second data entity to generate a knowledge data graph used to execute an application associated with natural language processing for document data. For example, relation extraction component 110 can employ a machine learning process comprising a bidirectional long short-term memory conditional random fields (BiLSTM-CRF) neural network to determine the relation between a first data entity comprising a context and a second data entity comprising a word entity that can be associated with such context. In some embodiments, relation extraction component 110 can determine such a relation between a first data entity and a second data entity to generate a common data model used to execute an application associated with natural language processing (e.g., named entity recognition) for document data. For example, as described below with reference to FIG. 7, relation extraction component 110 can determine a relation between a first data entity and a second data entity (e.g., via a BiLSTM-CRF neural network) to generate knowledge data graph 710 (e.g., via mapping technique(s), graph mapping technique(s), graph mapping algorithm(s), etc.) that can be used (e.g., by application component 604 as described below with reference to FIG. 6) to execute an application associated with natural language processing (e.g., named entity recognition) for document data. In this example, as described below with reference to FIG. 7, knowledge data graph 710 can comprise nodes 712 that can represent such a first data entity and a second data entity and edges 714 that can represent one or more relationships between such a first data entity and a second data entity.

In some embodiments, relation extraction component 110 can determine such a relation between a first data entity and a second data entity to generate (e.g., via unknown named entity discovery system 102) a knowledge data graph associated with natural language processing (e.g., named entity recognition) for document data. In some embodiments, relation extraction component 110 can determine such a relation between a first data entity and a second data entity to populate (e.g., via unknown named entity discovery system 102) the edges in a configuration management database (CMDB) between the entities that can be extracted from an IT change ticket (e.g., an IT change request), thereby establishing the relationships between such entities. In some embodiments, relation extraction component 110 can identify two relations: unrelated, where relation extraction component 110 can remove an edge if existent; and related, where relation extraction component 110 can add an edge if nonexistent.

In some embodiments, relation extraction component 110 can determine such a relation between a first data entity and a second data entity using an LSTM relation classifier based on a shortest dependency graph approach, where an example sentence can be parsed (e.g., via a dependency parser) to identify the syntactic relations between entities and only the relevant context between the entities will be fed to the LSTM (e.g., a Bi-LSTM). In some embodiments, relation extraction component 110 can determine such a relation between a first data entity and a second data entity using an LSTM relation classifier based on a classifying relation approach. For example, relation extraction component 110 can implement such an approach where the common ancestor between the two entities can be taken (e.g., extracted) and the path to that common ancestor from both entities can be fed into two LSTM networks which can encode the semantics of both paths. In this example, the two encoded representations can be fed into a deep neural network classifier for classification.

Figure 5:
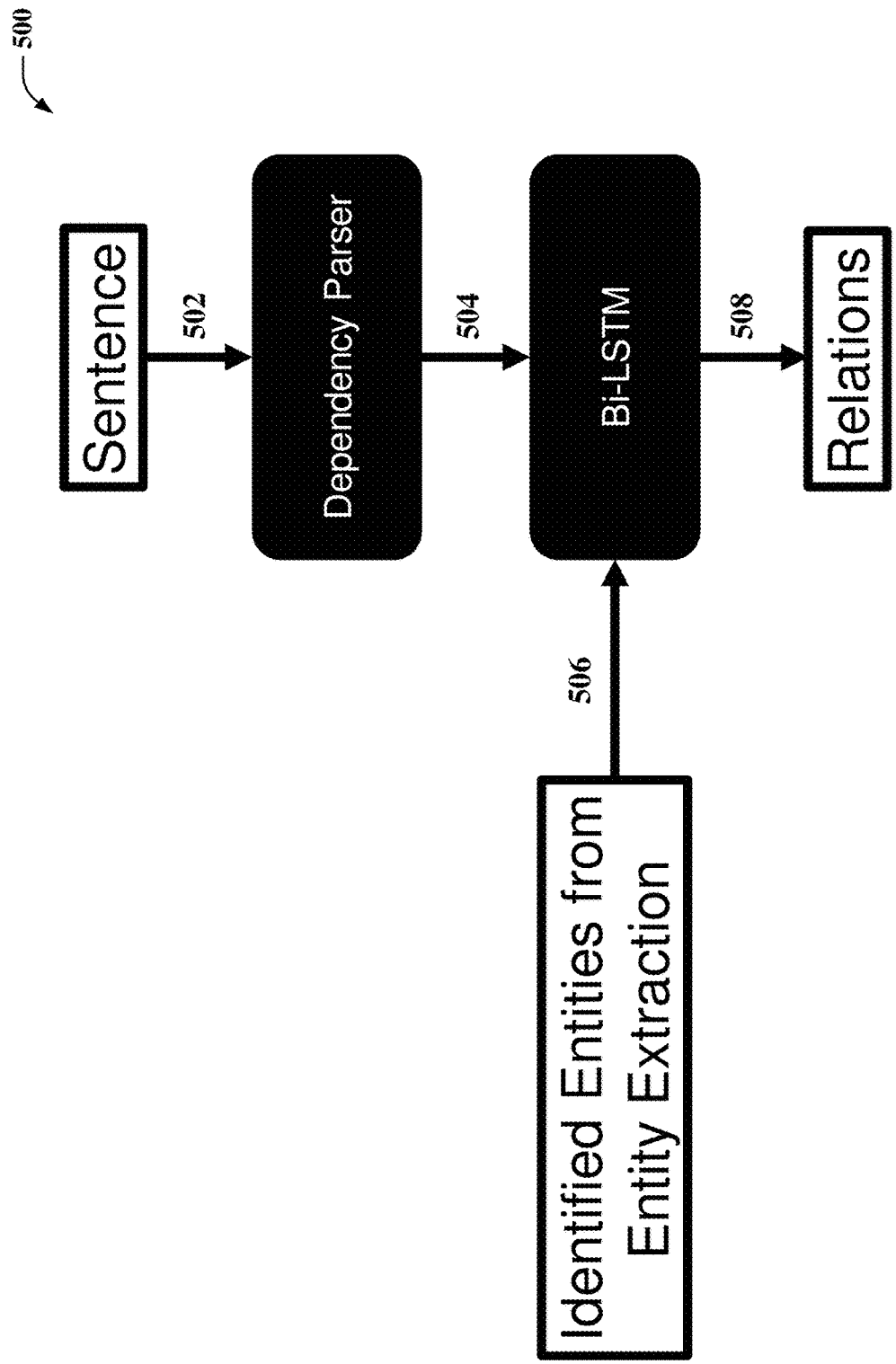
FIG. 5 illustrates a flow diagram of an example, non-limiting computer-implemented method that can facilitate extraction of named entities from document data to support automation applications in accordance with one or more embodiments described herein.

FIG. 5 illustrates a flow diagram of an example, non-limiting computer-implemented method 500 that can facilitate extraction of named entities from document data to support automation applications in accordance with one or more embodiments described herein. Repetitive description of like elements and/or processes employed in respective embodiments is omitted for sake of brevity.

In some embodiments, computer-implemented method 500 can comprise an example method of how relation extraction component 110 can determine a relation between a first data entity and a second data entity as described above with reference to FIG. 4. In some embodiments, at 502, computer-implemented method 500 can comprise inputting a sentence (e.g., example sentence 402) into a dependency parser (e.g. a standard parser, standard parser generator, etc.), where such a dependency parser can parse the sentence to enable identification of syntactic relation between a first data entity and a second data entity. In some embodiments, at 504, computer-implemented method 500 can comprise inputting the parsed sentence (e.g., where the parsed sentence can be formatted as a typed dependency tree, a parsed dependency tree, etc.) into a bidirectional long short-term memory (BiLSTM) neural network model (denoted as Bi-LSTM in FIG. 5). In some embodiments, at 506, computer-implemented method 500 can comprise inputting to the Bi-LSTM one or more entities (e.g., context, word entity, etc.) identified (e.g., extracted) by, for instance, entity extraction component 108 as described above with reference to FIG. 1. In some embodiments, at 508, computer-implemented method 500 can comprise outputting from the Bi-LSTM the one or more relations that can be determined by the Bi-LSTM based on the parsed sentence input at step 504 and/or the identified entities input at step 506. In some embodiments, the Bi-LSTM depicted in FIG. 5 can be employed by relation extraction component 110 to determine such one or more relations as described above with reference to FIG. 4.

Figure 6:
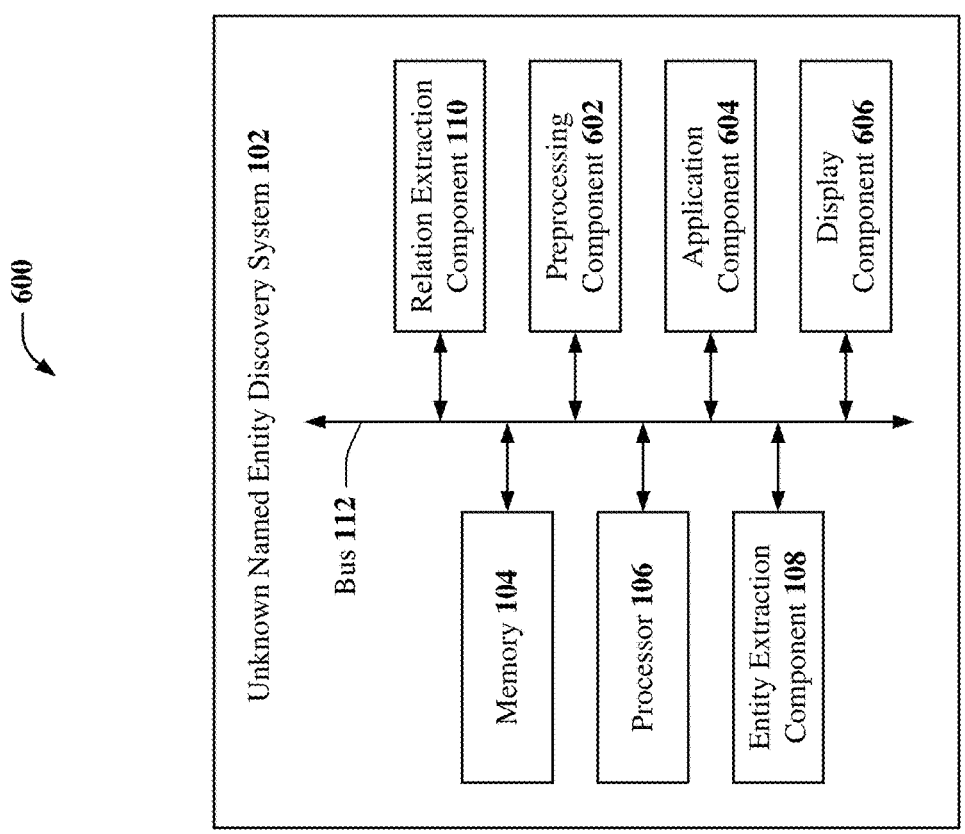
FIG. 6 illustrates a block diagram of an example, non-limiting system that can facilitate extraction of named entities from document data to support automation applications in accordance with one or more embodiments described herein.

FIG. 6 illustrates a block diagram of an example, non-limiting system 600 that can facilitate extraction of named entities from document data to support automation applications in accordance with one or more embodiments described herein. In some embodiments, system 600 can comprise unknown named entity discovery system 102. In some embodiments, unknown named entity discovery system 102 can comprise a preprocessing component 602, an application component 604, and/or a display component 606. Repetitive description of like elements and/or processes employed in respective embodiments is omitted for sake of brevity.

According to multiple embodiments, preprocessing component 602 can process document data to generate training data for a first machine learning process and/or a second machine learning process. For example, preprocessing component 602 can process second document data to generate training data for the first machine learning process and/or the second machine learning process described above with reference to FIG. 1, where such first machine learning process and/or second machine learning process can comprise one or more neural network models (e.g., BiLSTM-CRF neural network) that can be employed by entity extraction component 108 and/or relation extraction component 110 to extract one or more data entities from first document data and/or determine a relation between at least two of such one or more data entities (e.g., as described above with reference to FIG. 1).

In some embodiments, preprocessing component 602 can reduce vocabulary size of document data and reduce sparsity issues while learning patterns through machine learning algorithms In some embodiments, preprocessing component 602 can tokenize the words in document data. For example, preprocessing component 602 can separate the full stops and/or the commas from their attached words. In some embodiments, preprocessing component 602 can normalize the words in document data (e.g., using a dictionary). For example, preprocessing component 602 can normalize "db2" to "database." In another example, preprocessing component 602 can receive as input an example sentence comprising "Move db2 instance billing from server xyz123 to server abc567" and output "move database instance billing from server xyz123 to server abc567."

According to multiple embodiments, application component 604 can generate a server profile based on a knowledge data graph. For example, application component 604 can generate a server profile based on a knowledge data graph that can be generated by, for instance, unknown named entity discovery system 102 (e.g., via entity extraction component 108 and relation extraction component 110) based on known and/or unknown named entities that can be extracted by entity extraction component 108 and based on relationships between such entities that can be determined by relation extraction component 110. In some embodiments, application component 604 can employ such a knowledge data graph to generate a server profile. For example, based on receipt (e.g., by unknown named entity discovery system 102) of an IT service requests comprising "Restart database testdb on db instance inst123 on server xyz," "Increase the memory of server xyz from 8 GB to 16 GB," and/or "Increase the cpu of server xyz from 2 vCPU to 4 vCPU," entity extraction component 108 can extract parameters (e.g., word entities) comprising database name (DN): testdb, database instance name (DIN): inst123, server instance (SI): xyz, memory capacity (MQTY): 8 GB, and/or memory capacity (MQTY): 2vCPU. In this example, relation extraction component 110 can determine one or more relationships between such parameters to determine one or more specifications of server xyz such as, for instance, server xyz can have a memory capacity ranging from 8 gigabytes (GB) to 16 GB and/or server xyz can have a central processing unit (CPU) capacity ranging from 2 virtual CPU (vCPU) to 4 vCPU. In this example, based on such extracted parameters (e.g., entities) and such relationships between such entities, unknown named entity discovery system 102 (e.g., via entity extraction component 108 and relation extraction component 110) can generate a knowledge data graph that application component 604 can employ to generate a server profile corresponding to server xyz.

In some embodiments, application component 604 can perform an automation process associated with document data based on a knowledge data graph. For example, application component 604 can perform an automation process associated with document data based on a knowledge data graph that can be generated by, for instance, unknown named entity discovery system 102 (e.g., via entity extraction component 108 and relation extraction component 110) based on known and/or unknown named entities that can be extracted by entity extraction component 108 and based on relationships between such entities that can be determined by relation extraction component 110. In some embodiments, application component 604 can employ such a knowledge data graph to perform an automation process such as, for instance, restarting a database based on receipt (e.g., by unknown named entity discovery system 102) of an IT service request to restart the database. For example, based on receipt (e.g., by unknown named entity discovery system 102) of an IT service request comprising "Restart database testdb on db instance inst123 on server xyz," entity extraction component 108 can extract parameters (e.g., word entities) comprising database name (DN): testdb, database instance name (DIN): inst123, and/or server instance (SI): xyz. In this example, relation extraction component 110 can generate a common data model (CDM) and/or determine one or more relationships between such parameters, which can be expressed as "CDM: SI contains DIN, DIN contains DN" and "Instance Level: xyz contains inst123, inst123 contains testdb." In this example, based on such extracted parameters (e.g., entities) and such relationships between such entities, unknown named entity discovery system 102 (e.g., via entity extraction component 108 and relation extraction component 110) can generate a knowledge data graph that application component 604 can employ to automate the process of restarting the database testdb on db instance inst123 on server xyz as requested in the IT service request described above.

In some embodiments, application component 604 can augment a configuration management database (CMDB) based on a knowledge data graph. For example, application component 604 can augment an existing CMDB based on a knowledge data graph that can be generated by, for instance, unknown named entity discovery system 102 (e.g., via entity extraction component 108 and relation extraction component 110) based on known and/or unknown named entities that can be extracted by entity extraction component 108 and based on relationships between such entities that can be determined by relation extraction component 110.

According to multiple embodiments, display component 606 can generate a graphical user interface to display information associated with a knowledge data graph. In some embodiments, display component 606 can comprise a computer monitor, a computing device screen, and/or another device that can generate a graphical user interface (GUI) to display information associated with a knowledge data graph. In some embodiments, display component 606 can generate a graphical user interface (GUI) to display information associated with a knowledge data graph that can be generated by, for instance, unknown named entity discovery system 102 (e.g., via entity extraction component 108 and relation extraction component 110) based on known and/or unknown named entities that can be extracted by entity extraction component 108 and based on relationships between such entities that can be determined by relation extraction component 110. In some embodiments, display component 606 can generate a graphical user interface (GUI) to display information associated with a knowledge data graph including, but not limited to, one or more entities (e.g., vertices, nodes, etc.) of the knowledge data graph, one or more relationships (e.g., edges) between such one or more entities of the knowledge data graph, and/or other information associated with the knowledge data graph.

Figure 7:
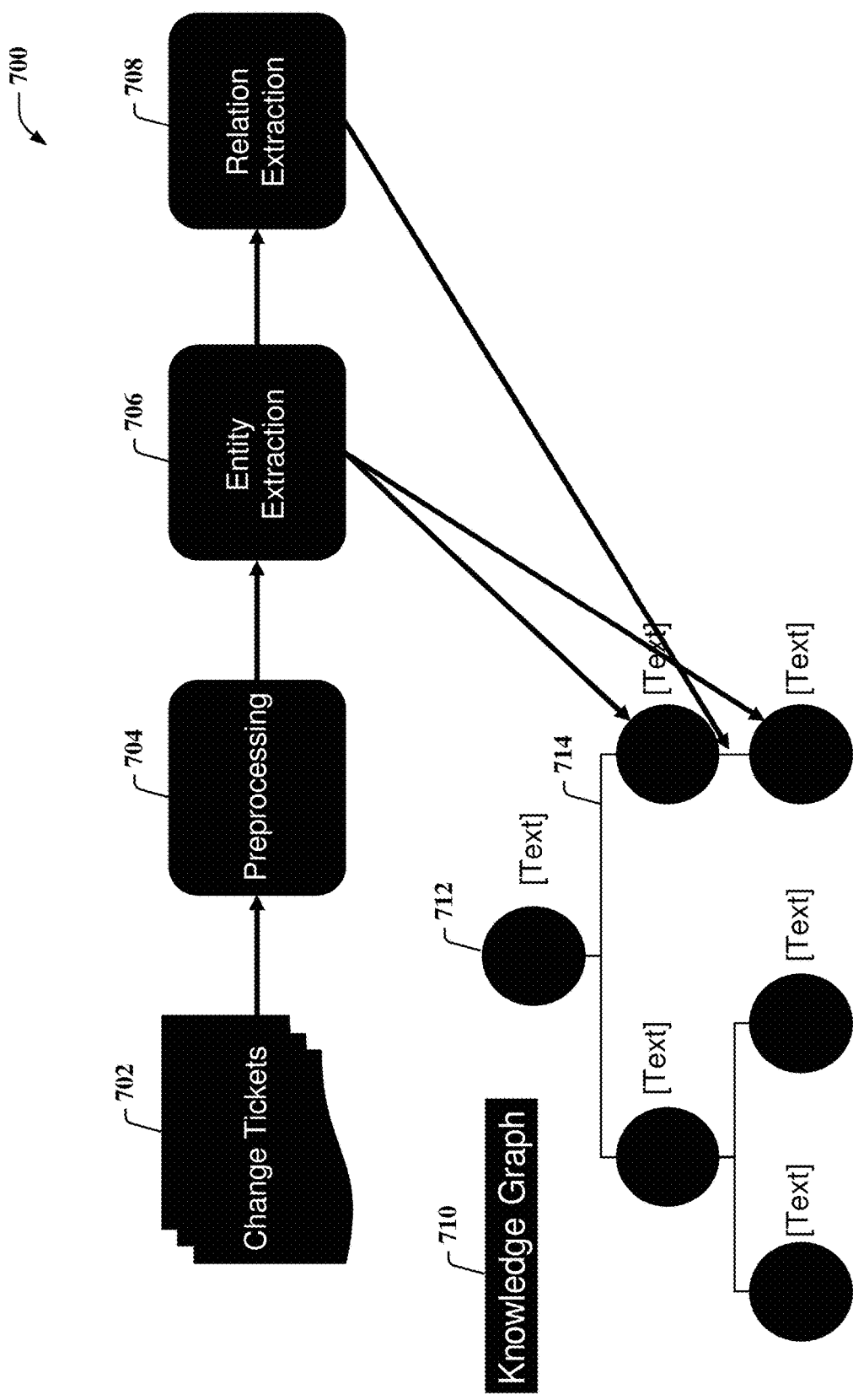
FIG. 7 illustrates a flow diagram of an example, non-limiting computer-implemented method that can facilitate extraction of named entities from document data to support automation applications in accordance with one or more embodiments described herein.

FIG. 7 illustrates a flow diagram of an example, non-limiting computer-implemented method 700 that can facilitate extraction of named entities from document data to support automation applications in accordance with one or more embodiments described herein. Repetitive description of like elements and/or processes employed in respective embodiments is omitted for sake of brevity.

In some embodiments, computer-implemented method 700 can comprise an example method of how unknown named entity discovery system 102 (e.g., via entity extraction component 108 and relation extraction component 110) can generate a knowledge data graph 710 (denoted as Knowledge Graph in FIG. 7). In some embodiments, at 702, computer-implemented method 700 can comprise inputting one or more change tickets (e.g., IT change requests) into preprocessing at 704. In some embodiments, such preprocessing at 704 can be performed by preprocessing component 602 as described above with reference to FIG. 6. In some embodiments, at 706, computer-implemented method 700 can comprise entity extraction of one or more entities (e.g., unknown named entities) from the change tickets of step 702. In some embodiments, such entity extraction at 706 can be performed by entity extraction component 108 as described above with reference to FIGS. 1, 2, 3, and 4. In some embodiments, at 708, computer-implemented method 700 can comprise relation extraction to determine one or more relationships between the one or more entities (e.g., unknown named entities) that can be extracted (e.g., by entity extraction component 108) at step 706. In some embodiments, such relation extraction at 708 can be performed by relation extraction component 110 as described above with reference to FIGS. 1 and 5.

In some embodiments, based on such entity extraction at 706 and/or such relation extraction at 708, unknown named entity discovery system 102 can generate knowledge data graph 710 (denoted as Knowledge Graph in FIG. 7). For example, to generate knowledge data graph 710, unknown named entity discovery system 102 (e.g., via relation extraction component 110) can employ one or more mapping techniques such as, for instance, one or more graph mapping techniques. For instance, to generate knowledge data graph 710, unknown named entity discovery system 102 (e.g., via relation extraction component 110) can employ one or more graph mapping techniques (e.g., one or more graph mapping algorithms) to map entities extracted at 706 and/or relationships extracted at 708 to a graph model by mapping such entities and/or relationships to a graph problem. In some embodiments, knowledge data graph 710 can comprise nodes 712 (e.g., vertices) that can be connected by edges 714, where nodes 712 can comprise text and/or word entities (denoted as [Text] in FIG. 7) that can be extracted (e.g., by entity extraction component 108) at 706 as described above and edges 714 can comprise relationships between nodes 712 that can be determined (e.g., by relation extraction component 110) at 708 as described above.

Figure 8:
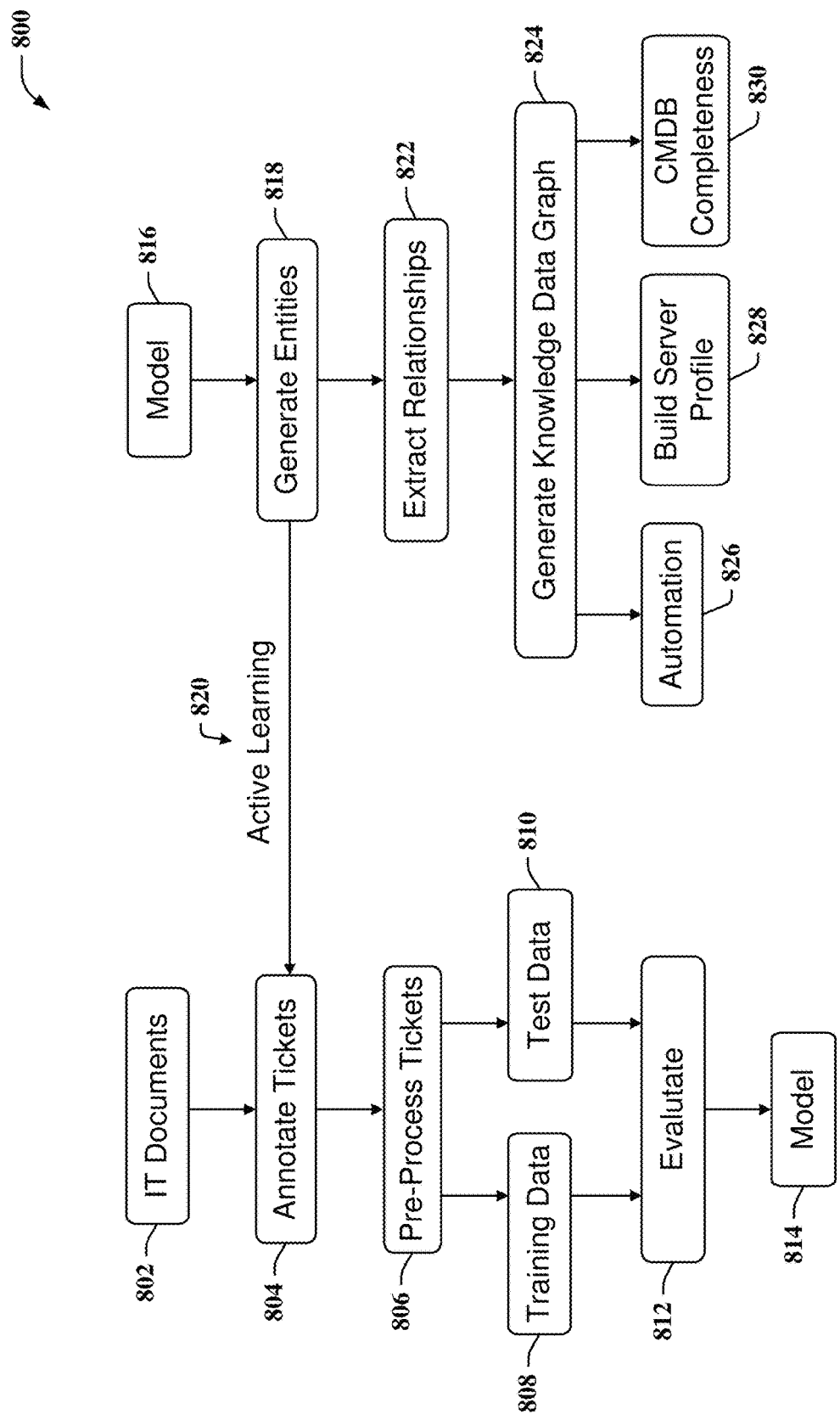
FIG. 8 illustrates a flow diagram of an example, non-limiting computer-implemented method that can facilitate extraction of named entities from document data to support automation applications in accordance with one or more embodiments described herein.

FIG. 8 illustrates a flow diagram of an example, non-limiting computer-implemented method 800 that can facilitate extraction of named entities from document data to support automation applications in accordance with one or more embodiments described herein. Repetitive description of like elements and/or processes employed in respective embodiments is omitted for sake of brevity.

In some embodiments, computer-implemented method 800 can comprise an example method of how unknown named entity discovery system 102 (e.g., entity extraction component 108, relation extraction component 110, etc.) can learn to extract one or more unknown named entities from document data (e.g., IT documents, IT change requests, IT service requests, etc.) and/or determine one or more relationships between such entities using multiple machine learning processes (e.g., via supervised learning, unsupervised learning, active learning, etc.).

In some embodiments, at 802, computer-implemented method 800 can comprise receiving (e.g., by unknown named entity discovery system 102) one or more IT documents (e.g., IT change requests, IT service requests, etc.).

In some embodiments, at 804, computer-implemented method 800 can comprise annotating tickets (e.g., IT change requests, IT service requests, etc.). For example, such annotating can be performed manually by, for instance, a human extracting them from the IT documents of step 802, where the resulting annotated tickets can be used to train (e.g., via supervised learning, unsupervised learning, active learning, etc.) a neural network model (e.g., a neural network model that can be employed by entity extraction component 108) to automatically (e.g., without assistance from a human) extract one or more unknown named entities (e.g., as described below).

In some embodiments, at 806, computer-implemented method 800 can comprise preprocess tickets (denoted as Pre-Process Tickets in FIG. 8). For example, preprocessing component 602 can preprocess the IT documents of step 802 and/or the annotated tickets of step 804.

In some embodiments, computer-implemented method 800 can comprise separating and/or compiling (e.g., via unknown named entity discovery system 102) training data at 808 and test data at 810, where such training data of step 808 and/or test data of step 810 can comprise the IT documents of step 802, the annotated tickets of step 804, and/or the preprocessed tickets of step 806.

In some embodiments, at 812, computer-implemented method 800 can comprise evaluating (e.g., via an entity such as, for instance, a programmer, a device, a computer, a robot, a machine, an artificial intelligence driven module, a human, etc.) the training data of step 808 and/or the test data of step 810. For example, at 812, an entity (e.g., a programmer, a device, a computer, a robot, a machine, an artificial intelligence driven module, a human, etc.) can evaluate such training data of step 808 and/or the test data of step 810 to ensure it has been properly annotated at step 804 and/or processed at step 806.

In some embodiments, at 814, computer-implemented method 800 can comprise inputting the training data of step 808 and/or the test data of step 810 into a model (e.g., via a BiLSTM-CRF neural network) to train such model (e.g., via supervised learning) to extract one or more unknown named entities from document data such as, for instance, the IT documents of step 802 and/or determine one or more relationships between such entities.

In some embodiments, at 816, computer-implemented method 800 can comprise employing a model (e.g., via a BiLSTM-CRF neural network), where such a model can comprise the model of step 814 that can be trained using training data of step 808 and/or test data of step 810.

In some embodiments, at 818, computer-implemented method 800 can comprise generating one or more entities. For example, generating such one or more entities can be performed by entity extraction component 108, where generating such one or more entities can comprise extracting one or more unknown named entities from an IT document (e.g., an IT change request, an IT service request, etc.).

In some embodiments, at 820, computer-implemented method 800 can comprise active learning. For example, the entities generated (e.g., extracted by entity extraction component 108) at step 818 can comprise annotations that can be used at step 804 to annotate tickets that can be preprocessed at step 806 and used to train the model of step 814 (e.g., as described above with reference to steps 802 to 814).

In some embodiments, at 822, computer-implemented method 800 can comprise extracting one or more relationships. For example, relation extraction component 110 can extract (e.g., determine) one or more relationships between the entities generated (e.g., extracted by entity extraction component 108) at step 818.

In some embodiments, at 824, computer-implemented method 800 can comprise generating a knowledge data graph. For example, unknown named entity discovery system 102 can generate such a knowledge data graph based on the one or more entities that can be generated (e.g., extracted by entity extraction component 108) at step 818 and/or the one or more relationships between such entities that can be extracted (e.g., determined) by relation extraction component 110 at step 822.

In some embodiments, computer-implemented method 800 can comprise automation at 826, building a server profile at 828, and/or completing (e.g., augmenting) a CMDB at 830. For example, as described above with reference to FIG. 6, application component 604 can perform such automation of step 826, building a server profile of step 828, and/or completing (e.g., augmenting) a CMDB of step 830 based on the knowledge data graph that can be generated by unknown named entity discovery system 102 at step 824.

In some embodiments, unknown named entity discovery system 102 can be associated with various technologies. For example, unknown named entity discovery system 102 can be associated with language model technologies, information retrieval technologies, information extraction technologies, cognitive computing technologies, conversation agent technologies, data analytics technologies, graph analytics technologies, artificial intelligence technologies, machine learning technologies, computer technologies, server technologies, information technology (IT) technologies, internet-of-things (IoT) technologies, automation technologies, and/or other technologies.

In some embodiments, unknown named entity discovery system 102 can provide technical improvements to systems, devices, components, operational steps, and/or processing steps associated with the various technologies identified above. For example, unknown named entity discovery system 102 can automatically (e.g., without assistance from a human): a) learn to extract unknown named entities from first document data (e.g., IT documents, IT change requests, IT service requests, etc.); b) learn to determine one or more relationships between such entities; c) generate a new knowledge data graph and/or augment an existing knowledge data graph based on such entities and relationships; d) use such a knowledge data graph to perform an automation process associated with second document data (e.g., IT documents, IT change requests, and/or IT service requests received by unknown named entity discovery system 102 after the first document data); e) use such a knowledge data graph to generate a server profile; and/or f) use such a knowledge data graph to augment a configuration management database (CMDB). In this example, by generating such a new and/or augmented knowledge data graph based on such unknown named entities and relationships between them that can be discovered by unknown named entity discovery system 102, unknown named entity discovery system 102 can facilitate improved accuracy, efficiency, and/or performance of any application component and/or processor that utilizes such a knowledge data graph to: 1) perform such an automation process described above; 2) generate such a server profile described above; 3) and/or augment such a CMDB described above, thereby providing technical improvements and/or advantages over existing technologies.

In some embodiments, unknown named entity discovery system 102 can provide technical improvements to a processing unit (e.g., processor 106) associated with a classical computing device and/or a quantum computing device (e.g., a quantum processor, quantum hardware, superconducting circuit, etc.). For example, by generating such a new and/or augmented knowledge data graph described above, unknown named entity discovery system 102 can facilitate improved accuracy, efficiency, and/or performance of a processing unit (e.g., processor 106) that utilizes such a knowledge data graph to: 1) perform such an automation process described above; 2) generate such a server profile described above; 3) and/or augment such a CMDB described above, thereby providing technical improvements and/or advantages over existing technologies.

In some embodiments, unknown named entity discovery system 102 can employ hardware or software to solve problems that are highly technical in nature, that are not abstract and that cannot be performed as a set of mental acts by a human. In some embodiments, some of the processes described herein can be performed by one or more specialized computers (e.g., one or more specialized processing units, a specialized quantum computer, etc.) for carrying out defined tasks related to the various technologies identified above. In some embodiments, unknown named entity discovery system 102 and/or components thereof, can be employed to solve new problems that arise through advancements in technologies mentioned above, employment of quantum computing systems, cloud computing systems, computer architecture, and/or another technology.

It is to be appreciated that unknown named entity discovery system 102 can utilize various combinations of electrical components, mechanical components, and circuitry that cannot be replicated in the mind of a human or performed by a human, as the various operations that can be executed by unknown named entity discovery system 102 and/or components thereof as described herein are operations that are greater than the capability of a human mind. For instance, the amount of data processed, the speed of processing such data, or the types of data processed by unknown named entity discovery system 102 over a certain period of time can be greater, faster, or different than the amount, speed, or data type that can be processed by a human mind over the same period of time.

According to several embodiments, unknown named entity discovery system 102 can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that unknown named entity discovery system 102 can include information that is impossible to obtain manually by an entity such as a human user. For example, the type, amount, or variety of information included in unknown named entity discovery system 102, entity extraction component 108, relation extraction component 110, model 400, preprocessing component 602, application component 604, and/or display component 606 can be more complex than information obtained manually by a human user.

Figure 9:
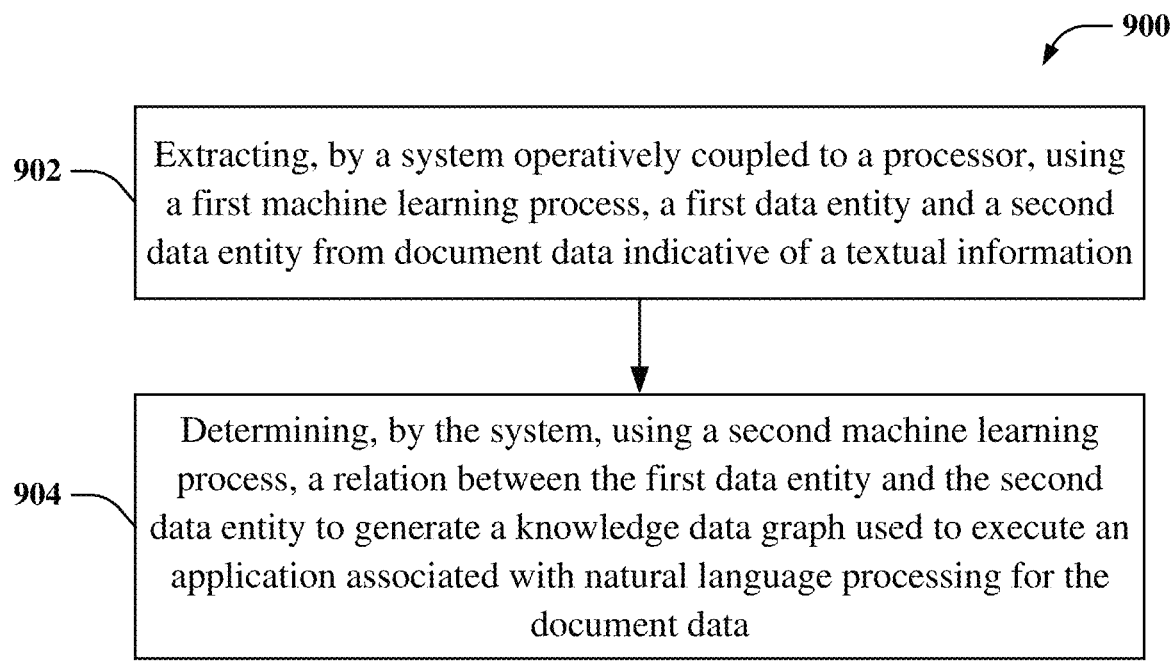
FIG. 9 illustrates a flow diagram of an example, non-limiting computer-implemented method that can facilitate extraction of named entities from document data to support automation applications in accordance with one or more embodiments described herein.

FIG. 9 illustrates a flow diagram of an example, non-limiting computer-implemented method 800 that can facilitate extraction of named entities from document data to support automation applications in accordance with one or more embodiments described herein. Repetitive description of like elements and/or processes employed in respective embodiments is omitted for sake of brevity.

In some embodiments, at 902, computer-implemented method 900 can comprise extracting, by a system (e.g., via unknown named entity discovery system 102 and/or entity extraction component 108) operatively coupled to a processor (e.g., processor 106), using a first machine learning process (e.g., via a BiLSTM-CRF neural network), a first data entity (e.g., a context) and a second data entity (e.g., a word entity associated with the first data entity, which can be a context) from document data (e.g., an IT document, an IT change request, an IT service request, etc.) indicative of a textual information (e.g., natural language).

In some embodiments, at 904, computer-implemented method 900 can comprise determining, by the system (e.g., via unknown named entity discovery system 102 and/or relation extraction component 110), using a second machine learning process (e.g., via a BiLSTM-CRF neural network, model 400, computer-implemented method 500, etc.), a relation (e.g., a relationship, an association, etc.) between the first data entity and the second data entity to generate a knowledge data graph (e.g., knowledge data graph 710) used to execute (e.g., via application component 604) an application associated with natural language processing (e.g., named entity recognition) for the document data.

For simplicity of explanation, the computer-implemented methodologies are depicted and described as a series of acts. It is to be understood and appreciated that the subject innovation is not limited by the acts illustrated or by the order of acts, for example acts can occur in various orders or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
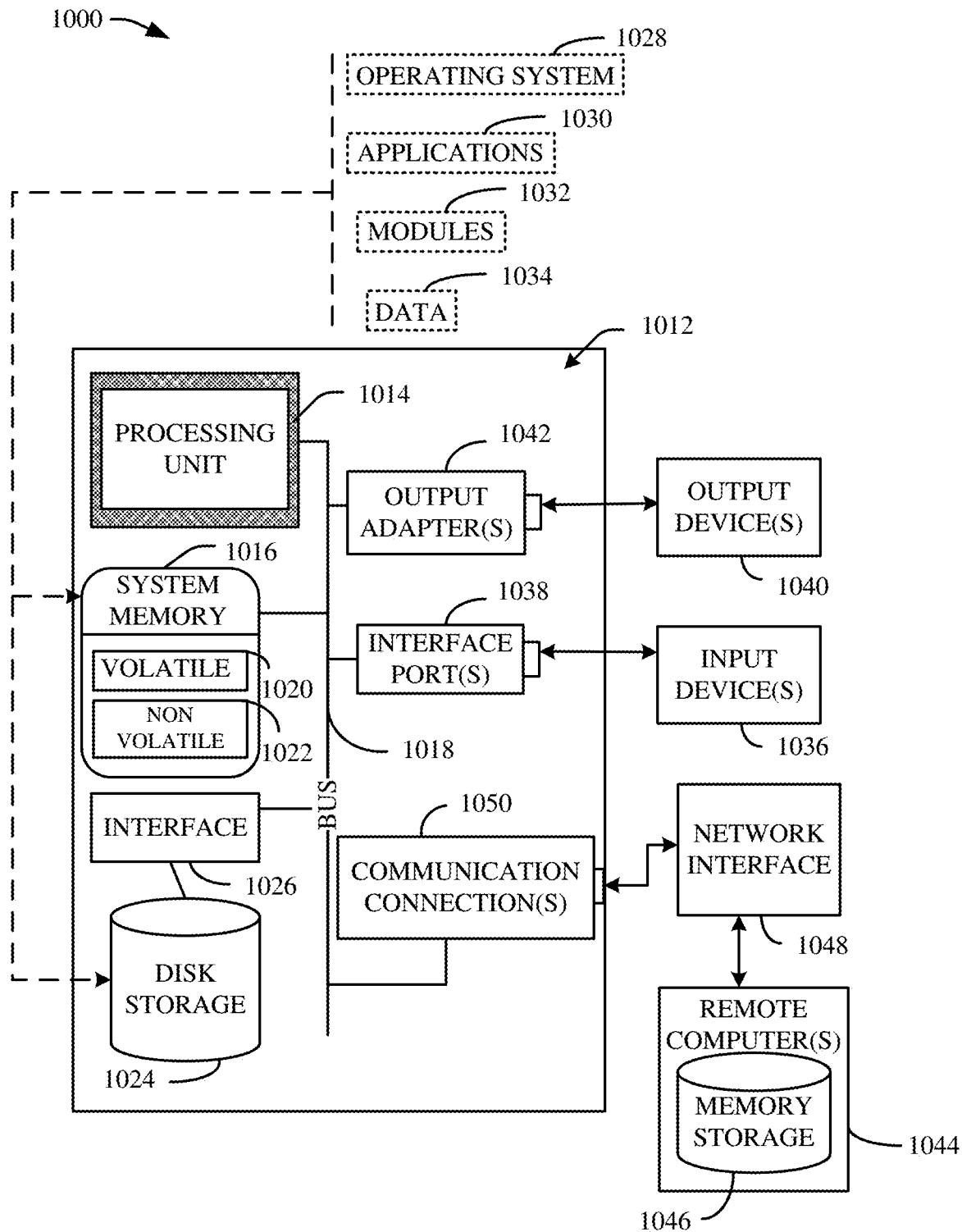
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements and/or processes employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Figure 11:
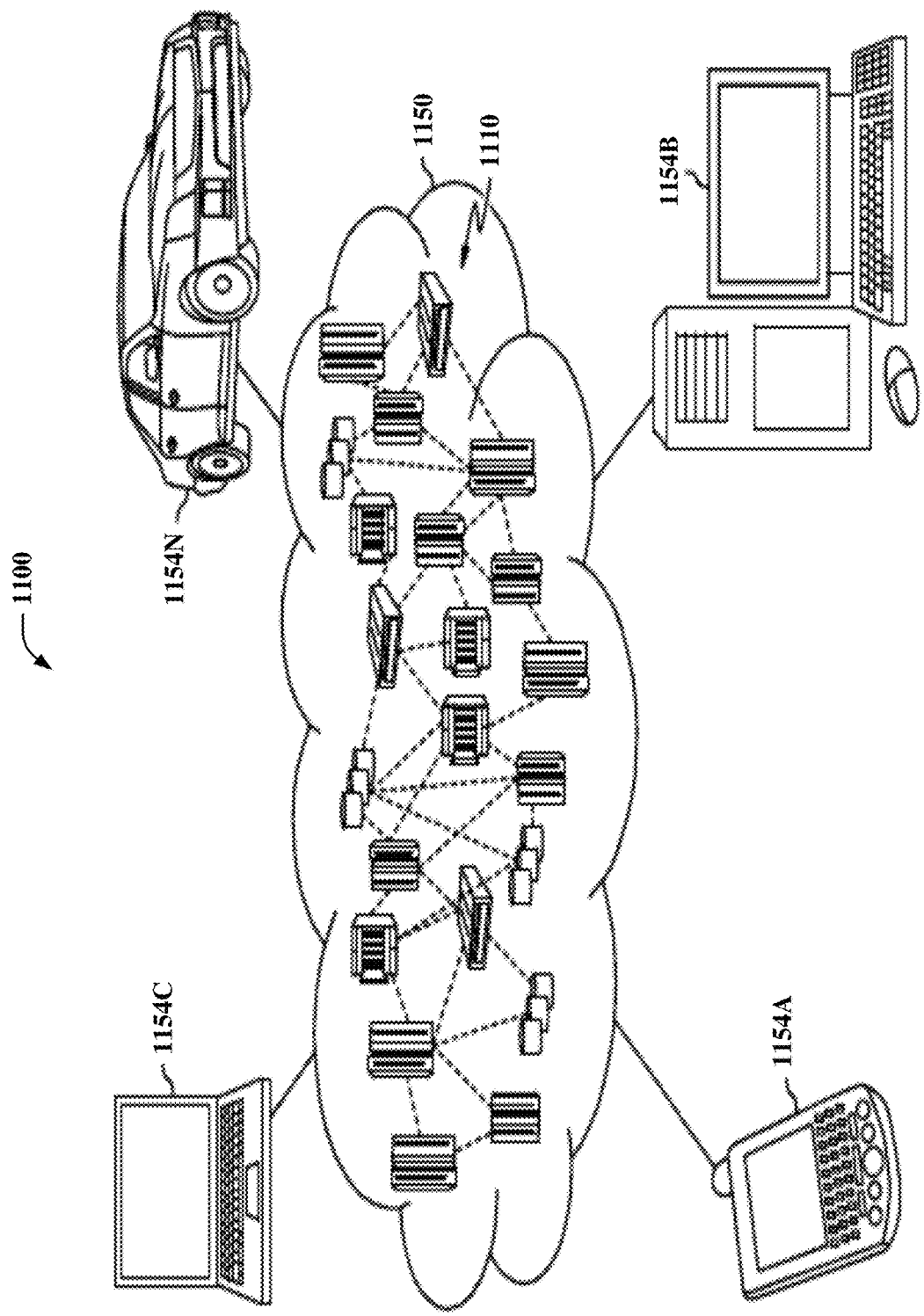
FIG. 11 illustrates a block diagram of an example, non-limiting cloud computing environment in accordance with one or more embodiments of the subject disclosure.

Referring now to FIG. 11, an illustrative cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
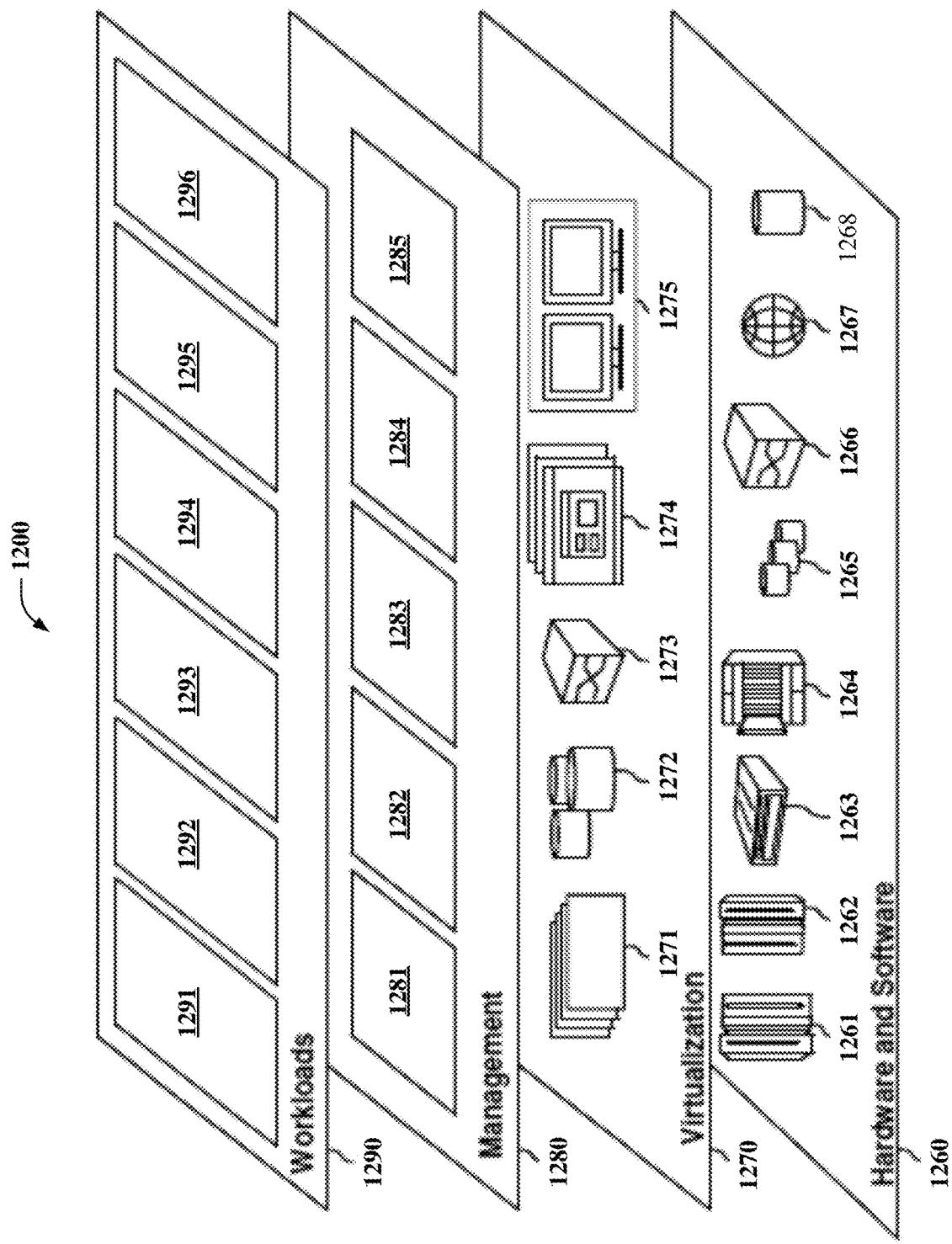
FIG. 12 illustrates a block diagram of example, non-limiting abstraction model layers in accordance with one or more embodiments of the subject disclosure.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Non-limiting examples of workloads and functions which may be provided from this layer include: mapping and navigation 1291; software development and lifecycle management 1292; virtual classroom education delivery 1293; data analytics processing 1294; transaction processing 1295; and unknown named entity discovery software 1296.

The present invention may be a system, a method, an apparatus or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations or block diagrams of methods, apparatus (systems), and computer program products according to embodiments of the invention. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
 a memory that stores computer executable components; and
 a processor that executes the computer executable components stored in the memory, wherein the computer executable components comprise:
  an entity extraction component that:
   comprises and employs a bidirectional long short-term memory conditional random fields (BiLSTM-CRF) neural network and, employing the BiLSTM-CRF neural network extracts, from a change request or a service request, using a first machine learning process, a first data entity and a second data entity from document data indicative of a textual information;
  a relation extraction component that:
   determines, using a second machine learning process, a relation between the first data entity and the second data entity;
   generates a knowledge data graph based on the relation between the first data entity and the second data entity; and
   executes an application associated with natural language processing for the document data based on the knowledge data graph generated from the relation between the first data entity and the second data entity; and
  an application component that:
   employs automation to build a server profile and augment a configuration management database, wherein the building and the augmentation is based on the knowledge data graph.

2. The system of claim 1, wherein the document data is first document data, and wherein the computer executable components further comprise:
 a preprocessing component that processes second document data to generate training data for the first machine learning process and the second machine learning process.

3. The system of claim 1, wherein the relation extraction component determines the relation between the first data entity comprising a context and the second data entity comprising a word entity associated with the context, wherein determination of the relation is based on employment of a bidirectional long short-term memory conditional random fields (BiLSTM-CRF) neural network.

4. The system of claim 1, wherein the relation extraction component generates a common data model associated with the natural language processing for the document data.

5. The system of claim 1, wherein the computer executable components further comprise:
a display component that generates a graphical user interface to display information associated with the knowledge data graph.

6. A computer-implemented method, comprising:
employing, by the system, a bidirectional long short-term memory conditional random fields (BiLSTM-CRF) neural network and, employing the BiLSTM-CRF neural network extracting, by a system operatively coupled to a processor, using a first machine learning process, from a change request or a service request, a first data entity and a second data entity from document data indicative of a textual information;
determining, by the system, using a second machine learning process, a relation between the first data entity and the second data entity to generate a knowledge data graph used to execute an application associated with natural language processing for the document data;
generating, by the system, a knowledge data graph based on the relation between the first data entity and the second data entity;
executing, by the system, an application associated with natural language processing for the document data based on the knowledge data graph generated from the relation between the first data entity and the second data entity; and
employing, by the system, automation to build a server profile and augment a configuration management database, wherein the building and the augmentation is based on the knowledge data graph.

7. The computer-implemented method of claim 6, further comprising:
processing, by the system, second document data to generate training data for the first machine learning process and the second machine learning process, wherein the document data is first document data.

8. The computer-implemented method of claim 6, further comprising:
generating, by the system, a common data model associated with the natural language processing for the document data.

9. The computer-implemented method of claim 6, further comprising:
performing, by the system, an automation process associated with second document data based on the knowledge data graph, wherein the document data is first document data, thereby facilitating at least one of improved accuracy, efficiency, or performance of the processor.

10. A computer program product facilitating extraction of named entities from document data to support automation applications, the computer program product comprising a computer readable storage medium having program instructions embodied therewith, the program instructions executable by a processor to cause the processor to:
employ, by the processor, a bidirectional long short-term memory conditional random fields (BiLSTM-CRF) neural network and, via the BiLSTM-CRF neural network extract, by the processor, using a first machine learning process, a first data entity and a second data entity from document data indicative of a textual information;
determine, by the processor, using a second machine learning process, a relation between the first data entity and the second data entity;
generate, by the processor, a knowledge data graph based on the relation between the first data entity and the second data entity;
execute, by the processor, an application associated with natural language processing for the document data, wherein execution is based on generation of a knowledge data graph and wherein the knowledge data graph is generated from the relation; and
employ, by the processor, automation to build a server profile and augment a configuration management database, wherein the building and the augmentation is based on the knowledge data graph.

11. The computer program product of claim 10, wherein the program instructions are further executable by the processor to cause the processor to:
process, by the processor, second document data to generate training data for the first machine learning process and the second machine learning process, and wherein the document data is first document data.

12. The computer program product of claim 10, wherein the program instructions are further executable by the processor to cause the processor to:
generate, by the processor, at least one of a common data model associated with the natural language processing for the document data or a server profile based on the knowledge data graph.

* * * * *